US009463865B2

(12) United States Patent
Frauen et al.

(10) Patent No.: US 9,463,865 B2
(45) Date of Patent: Oct. 11, 2016

(54) FUSELAGE CELL FOR AN AIRCRAFT, PARTICULARLY AN AIRPLANE

(71) Applicant: AIRBUS OPERATIONS GMBH, Hamburg (DE)

(72) Inventors: Holger Frauen, Hamburg (DE); Robert Alexander Goehlich, Hamburg (DE); Steffen Biesek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/628,489

(22) Filed: Sep. 27, 2012

(65) Prior Publication Data

US 2013/0099056 A1    Apr. 25, 2013

Related U.S. Application Data

(60) Provisional application No. 61/539,510, filed on Sep. 27, 2011.

(30) Foreign Application Priority Data

Sep. 27, 2011 (DE) .......................... 10 2011 083 553

(51) Int. Cl.
    *B64C 1/12*    (2006.01)
    *B64C 1/06*    (2006.01)
    *H02G 3/34*    (2006.01)

(52) U.S. Cl.
    CPC ............... *B64C 1/068* (2013.01); *B64C 1/061* (2013.01); *B64C 1/064* (2013.01); *B64C 1/12* (2013.01); *H02G 3/34* (2013.01)

(58) Field of Classification Search
    USPC ................. 244/119, 129.1, 131, 132
    See application file for complete search history.

(56) References Cited

U.S. PATENT DOCUMENTS 7,059,565 B2 *    6/2006    Scown et al. ............. 244/117 R
8,096,503 B2 *    1/2012    Verweyen .................... 244/119
(Continued)

FOREIGN PATENT DOCUMENTS

DE    102006007027 A1    10/2007
DE    102007044389 A1    4/2009
(Continued)

OTHER PUBLICATIONS

German Patent Office, Office Action for related German Patent Application, dated Mar. 19, 2013.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A fuselage cell for an aircraft includes at least two shell segments forming a fuselage cell. The shell segments are provided with a plurality of longitudinal and/or circumferential reinforcements that are integral with a skin panel of the respective shell segment. The reinforcements at least sectionally form a closed cross-sectional geometry together with at least the skin panel of the corresponding shell segment in order to create at least one hollow space, wherein at least one system component at least sectionally extends and/or at least one system medium is at least sectionally routed in the at least one hollow space. The reinforcements also fulfill the function of accommodating at least part of the system components and system mediums of the technical equipment of the aircraft. This results in weight savings and a simplified installation because the number of required mountings and connectors for the system components is reduced.

11 Claims, 2 Drawing Sheets

(56) References Cited

U.S. PATENT DOCUMENTS

Figure 1:
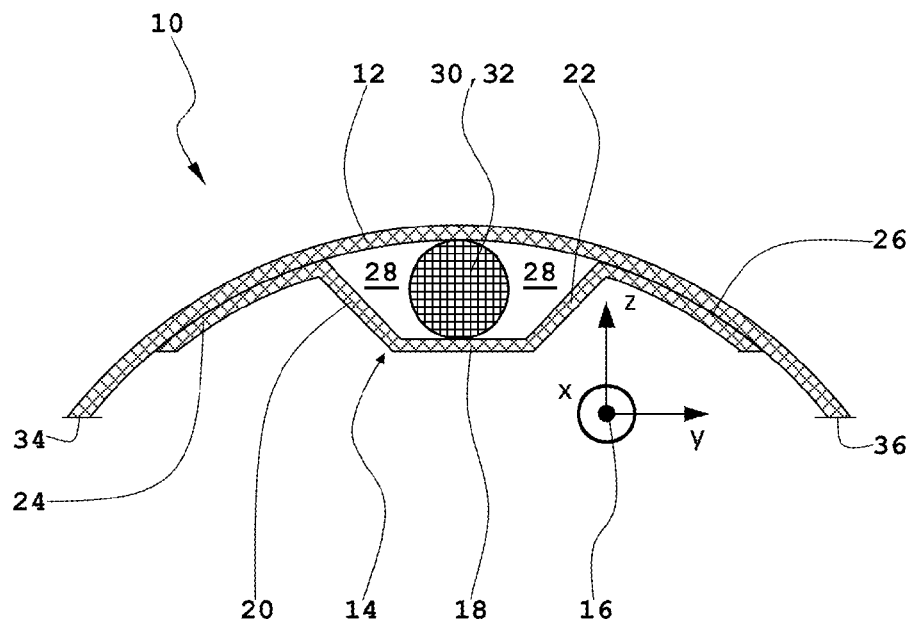

| | | |
|---|---|---|
| 8,128,030 B2 | 3/2012 | Dannenberg |
| 8,408,496 B2 * | 4/2013 | Stephan .................. 244/131 |
| 8,500,066 B2 * | 8/2013 | Lewis et al. ............... 244/119 |
| 8,556,211 B2 | 10/2013 | Hoffjann et al. |
| 8,800,921 B2 | 8/2014 | Gensch et al. |
| 8,844,870 B2 | 9/2014 | Goehlich |
| 2005/0044712 A1 | 3/2005 | Gideon et al. |
| 2009/0127393 A1 | 5/2009 | Guzman et al. |
| 2010/0318243 A1 | 12/2010 | Lewis et al. |

FOREIGN PATENT DOCUMENTS

| | | |
|---|---|---|
| DE | 102007061429 A1 | 7/2009 |
| DE | 102009015856 B4 | 1/2012 |
| DE | 102006050534 B4 | 12/2013 |
| WO | 9939975 A1 | 8/1999 |

* cited by examiner

FUSELAGE CELL FOR AN AIRCRAFT, PARTICULARLY AN AIRPLANE

The invention pertains to a fuselage cell for an aircraft, particularly an airplane, that is realized with a plurality of shells segments and a floor framework, wherein at least two shell segments form the fuselage cell and the shell segments are provided with a plurality of longitudinal and/or circumferential reinforcements that are realized integrally with a skin panel of the respective shell segment.

In order to achieve a further reduction in the fuel consumption of aircraft, it is necessary, among other things, to reduce their weight to a minimum. For this purpose, composite fiber materials, particularly CFRP materials, are increasingly utilized for manufacturing the primary structure in the construction of aircraft in addition to conventional aluminum and titanium materials.

After the completion of the primary structure, the aircraft is equipped with all technical system components required for flying operations. These technical system components consist, for example, of electrical, hydraulic, pneumatic or optical lines, aeration and ventilation ducts, fuel lines, water and waste water pipes, tanks, motors, engines, pumps, valves, control and/or regulating devices, as well as all interior fittings.

The connection of the system components to the primary structure of the aircraft is generally realized by means of the so-called secondary structure, for example, with the aid of A-, B- and C-holders. The A-holders produce the direct mechanical connection with the load-bearing primary structure while the B-holders (e.g., spacers) produce, for example, a defined offset or a clearance for the system component to be attached and the C-holders may be realized, for example, in the form of clips or cable ties.

The technical equipment of an aircraft with the required system components still requires a high manual installation effort and is usually carried out sequentially after the completion of the primary structure. At the same time, the weight of the aircraft is significantly increased due to the large number of mountings, as well as the required connectors between the system components. The space of the fuselage cell cross section furthermore is utilized inadequately. In order to at least partially counteract this equipment-related weight problem and the high installation effort, a number of approaches for realizing a weight reduction are known from the prior art and based, among other things, on a modified system integration.

An interior trim panel for a means of transport such as, for example, an aircraft, a bus or a ship is known, for example, from US 2005/0044712 A1. The interior trim panel is preferably manufactured with the aid of a low-pressure moulding process such as, for example, "Reaction Injection Moulding" (RIM). In addition, a thermal insulation, in which at least one air duct is embedded, is provided between an inner and an outer shell of the panel. In addition to its trim, insulation and air routing functions, however, this interior trim panel does not have any load-bearing functions whatsoever.

DE 10 2007 044 389 A1 pertains to a structural component and a fuselage of an aircraft or spacecraft. The structural component serves for reinforcing a skin panel and is realized in the form of a closed hollow profile that not only fulfills its actual load-bearing function, but is also suitable for routing a system medium. The system medium may consist, for example, of a gas, a liquid, an electrical line or a fiber optic cable. The hollow profile is mounted in the structure with a plurality of receiving trestles that are respectively provided with a clip bracket. The receiving trestles simultaneously fulfill the function of the so-called "clips" in conventional fuselage cell structures and therefore are connected to the skin and the stringer profiles of the aircraft fuselage cell while the clip brackets are pulled together with screws in order to clamp and fix the position of the hollow profile. However, the large number of individual parts to be joined together increases the installation and maintenance effort.

Furthermore, DE 10 2006 007 027 A1 discloses a double-walled floor segment for accommodating system components of a means of transport, particularly an aircraft. The floor segment forms part of a floor surface and separates an interior from a lower space within the aircraft fuselage cell. The floor segments are preferably realized modularly and can be positioned in at least two rows such that individual floor segments can be easily exchanged within a floor that is composed of such segments. However, this requires that the floor segments to be exchanged respectively have the same or compatible dimensions and connections for the system components. The floor segments are self-supporting and introduce the occurring floor loads into the fuselage cell structure.

A system of electrical and/or optical lines for an aircraft, particularly an airplane, is known from DE 10 2006 050 534 A1. The lines are directly embedded in the structural components, particularly the skin panels. If the structural components consist of aluminum, it is necessary to at least sectionally apply an electrically insulating support layer, on and/or in which the lines subsequently extend, onto the inner sides of the assemblies. If the structural components consist of fiber-reinforced plastic materials, the lines can be directly embedded in the fiber reinforcement and/or the surrounding resin matrix.

WO 99/39975 discloses structural components for an aircraft with a completely modular design, wherein the structural components have two functions. This means that the components not only fulfill their structural load-bearing function, but also another function such as, for example, the accommodation of electrical, hydraulic or pneumatic system components required for the operation of an aircraft. In an exemplary embodiment, an air-conditioning system is incorporated into a structural component. Air ducts are provided in the lower frame end of the structural component in order to supply the air-conditioning system (air-conditioner) with air. This not only significantly reduces the effort for the pipework installation. When such a structural component is installed, its double function as a system carrier and as a load-bearing component furthermore makes it possible to dimension the remaining aircraft structure in a mechanically weaker fashion, i.e., with a reduced load-bearing capacity. In addition, it is possible to quickly exchange the modularly designed structural components.

Furthermore, a fuselage segment, as well as a method for its manufacture, is known from DE 2009 015 856 A1. The fuselage segment is realized with an inner skin and an outer skin, between which a core structure for spacing apart the fuselage cell skins is arranged. Ducts for the system installation extend within the core structure. However, this known integration of system components is based on double-shell fuselage cell structures.

It therefore is the objective of the invention to develop a fuselage cell for an aircraft, particularly an airplane, that makes it possible to achieve a significant weight reduction in comparison with conventional embodiments and can be equipped with the technical system components required for flying operations with a significantly reduced installation effort.

This objective is attained with a fuselage cell with the characteristics of claim 1.

Due to the fact that the longitudinal and/or circumferential reinforcements at least sectionally form a closed cross-sectional geometry together with at least the skin panel of the corresponding shell segment in order to create at least one hollow space and the fact that at least one system component at least sectionally extends and/or at least one system medium is at least sectionally routed in the at least one hollow space, a significant weight reduction is achieved because the primary structure simultaneously fulfills the function of integrating the technical system components in addition to its primary load-bearing function. The hollow spaces formed by the longitudinal and/or circumferential reinforcements consequently represent ducts that are realized similar to cable conduits and serve for accommodating all types of system components and/or system mediums. The double function of the reinforcements as load-bearing elements and as accommodations for the system components results in a significant weight saving potential. Due to the high inherent stability of the shell segments, they can be assembled, for example, into a fuselage section or a so-called "fuselage barrel" without any other auxiliary means such as, for example, a framework, a presentation frame or the like, wherein several fuselage sections that are arranged in a row and connected to one another ultimately form the fuselage cell. The high inherent stability of the shell segments furthermore makes it possible to realize large-format shell segments that can reach a length up to 25 m. Such shell segments make it possible, for example, to manufacture a fuselage cell of an aircraft in a semi-monocoque fashion with two or four shell segments. In the context of this description, system components are technical equipment components of the aircraft such as, for example, electrical supply lines, data lines, pumps, valves, control and/or regulating devices, computer units, water and waste water tanks, water and waste water pipes and air-conditioning ducts while the system mediums consist, for example, of fresh water, hydraulic oils, kerosene, air, nitrogen, hydrogen, oxygen, etc. If applicable, the system mediums may be routed directly, i.e., without separate ducts inserted into the hollow spaces, in the reinforcing elements that act as a pipeline in this case.

If applicable, system components themselves such as, for example, thick-walled pipelines or power cables may at least partially act in a load-bearing fashion.

According to an advantageous enhancement of the fuselage cell, it is proposed that at least one longitudinal and/or circumferential reinforcement of at least one shell segment at least sectionally has an open and/or a closed cross-sectional geometry.

This makes it possible to selectively utilize closed hollow profiles and/or open hollow profiles as reinforcing elements. For example, the longitudinal reinforcements may have a trapezoidal or a U-shaped cross-sectional geometry, i.e., an open cross-sectional geometry. The circumferential reinforcements may, for example, have a U-shaped or Z-shaped cross-sectional geometry. The longitudinal and/or lateral reinforcements may alternatively or additionally have a closed cross-sectional geometry. In such a constellation, the reinforcements are formed, e.g., by square, rectangular or tubular hollow profiles. The longitudinal and/or circumferential reinforcements may respectively feature at least one inlet and outlet for at least one system component.

In another advantageous embodiment of the fuselage cell, it is proposed that at least one longitudinal reinforcement at least sectionally has a $\Omega$-shaped cross-sectional geometry.

This makes it possible to preserve the standard profile geometry for longitudinal reinforcements that is widely used in the construction of aircraft without modifications. The longitudinal and/or the circumferential reinforcements are preferably bonded to the skin panel. Alternatively, the longitudinal and/or circumferential reinforcements may be realized in one piece with the skin panel of the shell segment during the manufacturing process. In addition, the reinforcements may also be joined with the skin panel by means of connecting elements such as, for example, rivets or bolts.

According to an enhancement of the fuselage cell, it is proposed that at least one system component that absorbs at least part of the occurring loads is respectively integrated into the floor framework. Due to this measure, the system components absorb at least part of the mechanical loads to be absorbed by the floor framework such that another weight saving potential is realized. The floor framework may be realized with several self-supporting and inherently stable floor modules that can be arranged in rows on all sides in a matrix-like fashion and already pre-equipped with all required system components such that the installation is further simplified. In addition, only one floor module needs to be exchanged in case of a defect. The floor framework may feature longitudinal reinforcements, for example, with a rail-like cross-sectional geometry. For example, this makes it possible to easily "thread" system components on the longitudinal reinforcements and to fix the system components in the respective axial position referred to the longitudinal aircraft axis with the aid of fixing means in order to further simplify the installation.

According to another advantageous embodiment of the fuselage cell, it is proposed that at least one system component consists of at least one electrical and/or at least one optical line for transmitting energy and/or information.

In this way, the installation is significantly simplified because the majority of the required wiring of the aircraft is already integrated into the shell segments. Furthermore, the number of mountings required for fixing the position, as well as the number of connectors, is also reduced such that an additional weight saving is achieved.

According to another constructive embodiment, the at least one system component consists of at least one hydraulic line, at least one pneumatic line and/or at least one air-conditioning duct.

A significant weight reduction is achieved due to the utilization of the hollow spaces within the reinforcements of the shell segments. The overall volume of the hollow spaces in the reinforcements may be so large that they may optionally serve as a tank for accommodating and temporarily storing the system mediums.

According to another embodiment of the fuselage cell, the at least one system medium consists of a means for detecting cracks, particularly a dye, and/or a means for sealing cracks.

In this way, the native self-monitoring option of the fuselage cell (the so-called "health monitoring") is initially realized. Particularly a dye that can easily be visually perceived (e.g., "Fluescin®") may be considered as a means for detecting cracks. In addition, the means for sealing cracks enables the fuselage cell—at least to a certain extent—to repair itself or heal itself as long as the size of a crack in the reinforcements or in the adjacent skin panel does not yet exceed a permissible maximum value.

In an enhancement of the fuselage cell, it is proposed that the skin panels, as well as the longitudinal and/or circumferential reinforcements of the shell segments, are realized with a metallic material and/or a composite fiber plastic material.

Due to the thusly achieved, possibly hybrid construction of the fuselage cell, it can fulfill other functions in addition to its primary load-bearing function. For example, metallic longitudinal reinforcements may function as a ground return if the skin panels are realized with CFRP materials. In addition, metallic longitudinal reinforcements may support the function of the copper mesh (so-called "mesh") required for the lightning protection in CFRP skin panels such that a lighter copper mesh can be used. For this purpose, the copper mesh integrated into the skin panel is electrically connected to the longitudinal reinforcement in a suitable fashion such that the lightning energy absorbed by the copper mesh is at least partially diverted into the metallic stringer.

In another advantageous embodiment of the fuselage cell, the metallic material is a light alloy, particularly an aluminum alloy or a titanium alloy.

This not only makes it possible to achieve a low weight of the shell segments and the fuselage cell consisting of these shell segments, but also a high mechanical load-carrying capacity. If applicable, a sufficient electric conductivity may furthermore be realized for instances, in which the longitudinal and circumferential reinforcements and/or the skin panels should also fulfill secondary electric conduction functions in addition to their primary load-bearing function.

According to another advantageous embodiment of the fuselage cell, the composite fiber material consists of a fiber-reinforced thermosetting epoxy resin that is reinforced, in particular, with carbon fibers or of a fiber-reinforced thermoplastic polymer.

Due to these measures, it is possible to utilize proven manufacturing processes and fabricating means (e.g., autoclaves) that allow, in particular, the realization of a reliable manufacturing process for large-format shell segments that is compatible with large-scale production.

Figure 2:
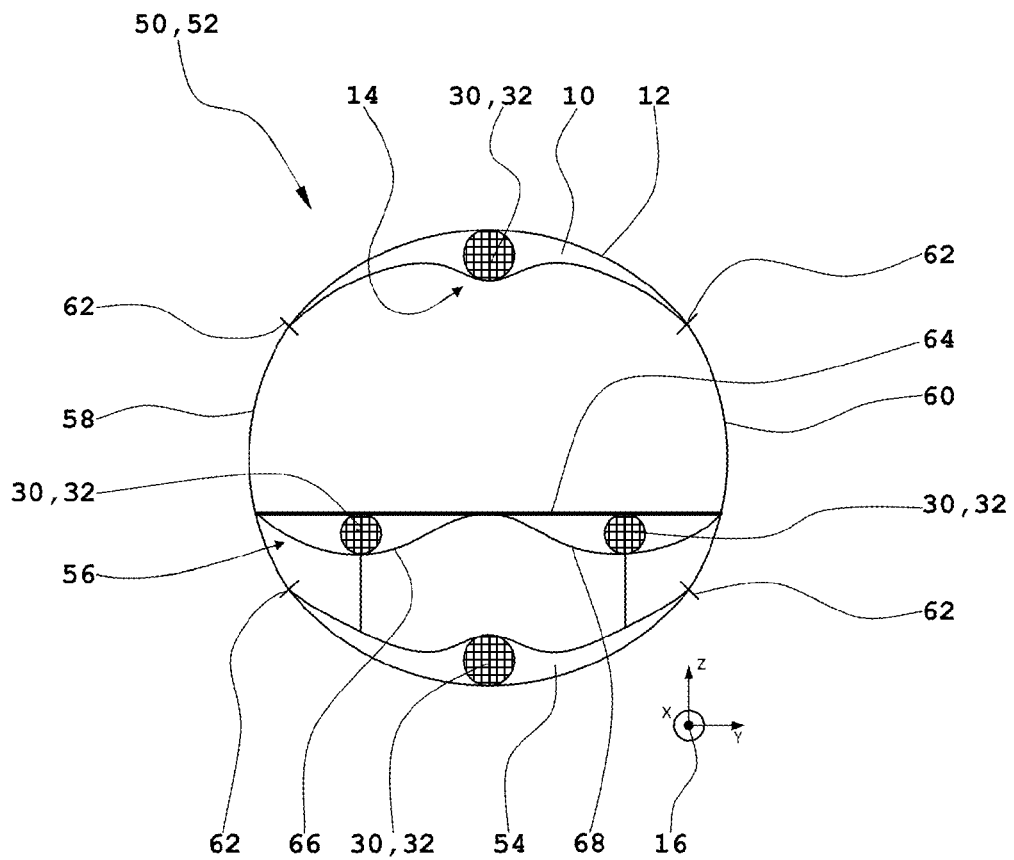
Figure 3:
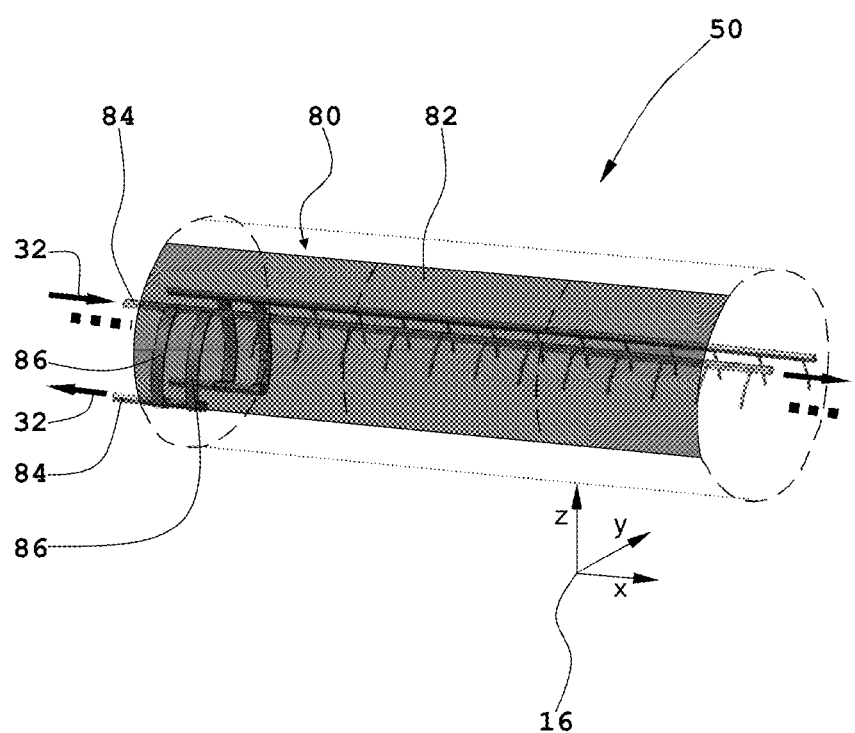

In the drawings:

FIG. 1 shows a schematic cross section through an integrally designed shell segment, FIG. 2 shows a highly simplified cross section through a fuselage cell or a fuselage section, respectively, and FIG. 3 shows a basic illustration of a "long" shell segment with a plurality of double-functional, integral longitudinal and circumferential reinforcements.

In the drawings, identical constructive elements are respectively identified by the same reference symbol if no explicit reference thereto is provided.

FIG. 1 shows a simplified cross section through an integrally designed shell segment.

Among other things, a shell segment 10 comprises a plane or at least one-dimensionally curved skin panel 12, the underside of which is provided with an integral longitudinal reinforcement 14 that is realized in the form of a "stringer" in this case. In contrast to the illustration in FIG. 1, a plurality of such longitudinal reinforcements that extend parallel to and at a distance from one another is generally provided. Any possibly existing circumferential reinforcements are also not illustrated in FIG. 1. A coordinate system 16 elucidates the position of all components in space. The x-axis of the coordinate system 16 points in the direction of a longitudinal axis of a not-shown aircraft fuselage cell while the y-axis extends transverse to this longitudinal axis and approximately parallel to and at a distance from the airfoils or the elevator unit of the aircraft, respectively. A not-shown floor framework also extends parallel to and at a distance from the xy-plane of the coordinate system 16. The z-axis symbolizes the vertical axis of the aircraft. In this example, the longitudinal reinforcement 14 has a Ω-shaped cross-sectional geometry (so-called "Ω-stringer" or "Omega-stringer") with a base section 18, two inclined flanks 20, 22 and two flanges 24, 26 for the connection to the skin panel 12. The oppositely inclined flanks 20, 22 are connected to both ends of the base section 18 and respectively continue in the form of a flange 24, 26. In this case, the cross-sectional geometry of the skin panel 12 corresponds to a ring segment. The integral longitudinal reinforcement 14 may, for example, be bonded to the skin panel 12 or realized in one piece with this skin panel during the manufacture of the shell segment 10.

For example, at least one system component 30 extends in a conduit-like hollow space 28, wherein this hollow space extends parallel to the x-axis and is defined by the skin panel 12 and the cross-sectional geometry of the longitudinal reinforcement 14 that is partially open toward the top (z-direction). A system medium 32 may also be situated in the hollow space 28 instead of or in addition to the system component 30. All occurring technical equipment systems of an aircraft such as, for example, electrical supply lines, data lines, optical lines, pumps, assemblies, motors, valves, control and/or regulating devices, computer units, water and waste water tanks, water and waste water pipes, air-conditioning ducts and aeration or ventilation ducts are considered to be system components. The system medium 32, in contrast, may consist of a fluid, i.e., a gaseous and/or liquid substance such as, for example, kerosene, hydraulic oil, fresh water, waste water, air, compressed air, nitrogen, hydrogen, helium or oxygen.

Consequently, the integral longitudinal reinforcement 14 of the shell segment 10 has a double function. On the one hand, the longitudinal reinforcement 14 represents part of the load-bearing primary structure of the fuselage cell while the longitudinal reinforcement 14 on the other hand serves for routing system components 30 and/or system mediums 32. Due to this double function of the longitudinal reinforcement 14, a majority of the otherwise required mountings and connectors for the system components are eliminated, among other things, such that a significant weight saving potential is realized. In addition, the manufacture of the aircraft fuselage cell is significantly simplified because it is merely required to join inherently stable shell segments that are at least partially pre-equipped with the system components 30. Connectors or interfaces for the system components merely need to be provided in the region of the transverse joints that are produced during the joining of the fuselage section. Connectors are usually not required in the region of the longitudinal seams between the shell segments (see FIG. 2) because the majority of system components extend parallel to the x-axis. If the longitudinal and circumferential reinforcements are directly utilized for routing or storing a system medium, i.e., without separately inserted pipelines, linings, coatings, ducts or the like, a further weight reduction is achieved because the otherwise required additional pipelines are eliminated. A weight saving potential may furthermore be realized if the system components are also able to at least partially fulfill a load-bearing function in addition to their actual functions during flying operations and ground operations because the primary structure can be dimensioned weaker in this case. However, the system component 30 needs to consist of a conduit that can be subjected to a sufficient mechanical load such as, for example a pipeline or of an electrical line with large cross-sectional surface in this case.

In contrast to the illustrated Ω-shaped cross-sectional geometry of the longitudinal reinforcement 14 that is partially open on the upper side, it is also possible to utilize a closed cross-sectional geometry such as, for example, a triangular hollow profile, a square hollow profile, a rectangular hollow profile, a trapezoidal hollow profile or a pipeline profile with an annular, oval or elliptical cross-sectional geometry. At least one not-shown inlet and outlet may be respectively arranged in the longitudinal reinforcement 14 in order to respectively introduce and lead out the system component 30 or the system medium 32. In the simplest case, the inlet and outlet consist of recesses, particularly in the form of bores, for routing line-shaped system components. The possibly inclined bores may additionally feature a protection against mechanical damages (e.g., rubbing points) and/or an anti-kink device such as, for example, a lead-through or a screwed cable gland. In addition, the recesses may be equipped with connectors such as, for example, separable plug-type connectors or couplings for the system components or the system mediums.

In addition, at least one not-shown shell segment of the fuselage cell may be provided with a door frame for an aircraft door, particularly for accommodating a passenger door or a cargo hold door of the aircraft fuselage cell. The door frame may be realized, for example, with two integrally designed circumferential reinforcements, particularly (annular) frames, that extend parallel to and at a distance from one another and two integral longitudinal reinforcements, particularly additionally reinforced stringers, that extend transverse to and at a distance from the circumferential reinforcements. The distances between two respective longitudinal and circumferential reinforcements are chosen such that they match the aircraft door or the required door cutout in the skin panel 12.

The joining of the shell segment 10 with other not-shown shell segments is preferably realized along the two longitudinal edges 34, 36 such that not-shown longitudinal seams are created. Up to four shell segments (so-called "four-shell design") are frequently joined into a complete fuselage section (so-called "fuselage barrel"). Several fuselage sections are then arranged in a row and joined into a fuselage cell such that lateral seams are created over the circumference. Alternatively, the manufacture may also be realized by utilizing at least two shell segments that respectively have the approximate shape of a half-shell (so-called "double-shell design"). The shell segments used may respectively have a length up to 25 m such that fuselage cells with smaller dimensions can already be realized with two shell segments that have the approximate shape of half-shells.

The skin panel 12 of the shell segment 10, the integral longitudinal reinforcement 14 and a not-shown circumferential reinforcement may be realized with a light alloy, particularly an aluminum alloy and/or a titanium alloy, as well as with a suitable composite fiber plastic material that can be subjected to high mechanical stresses. Other metallic materials such as, for example, special steel may also be used. Epoxy resins that are reinforced with carbon fibers or heavy-duty thermoplastic polymers that are reinforced with carbon fibers, in particular, may be considered as composite fiber plastic material. Particularly the skin panel 12 may alternatively be realized with a succession of aluminum foils and polyester layers that are reinforced with glass fibers (so-called "Glare®"). Furthermore, a different material may be respectively used for the longitudinal reinforcements, the circumferential reinforcements and/or the skin panel 12.

For example, the longitudinal and/or the circumferential reinforcements may be alternately manufactured of a light alloy and of a composite fiber plastic material while the skin panel 12 is realized with a composite fiber plastic material that usually has only a slight electric conductivity. For example, if the skin panel 12 is manufactured of an epoxy resin that is reinforced with carbon fibers (CFRP) and the longitudinal reinforcement 14 is manufactured of a metallic material, the longitudinal reinforcement 14 may serve, for example, as a ground return and/or for supporting the lightning protection mechanism of the skin panel 12 such that weight savings can be realized because an additional ground cable is no longer required. In order to support the lightning protection functionality of the skin panel 12, a copper mesh that is integrated, e.g., into the skin panel 12 is electrically contacted with the conductive longitudinal reinforcements in a suitable fashion. This contacting may be realized, for example, in that a few strands of the copper mesh integrated into the region of an outer side of the skin panel 12 are intertwined into a braided strand that extends through the prepreg layers or is "surrounded by a flow" thereof in the region of the contacting point to be produced, wherein the braided strand protrudes from the inner surface of the skin panel 12 by a certain distance. This flexible protruding section of the braided strand can be connected to the electrically conductive longitudinal reinforcement after the completion of the curing and consolidation process of the shell segment 10 in autoclaves, e.g., by means of a riveted joint, a clamped joint or a screwed joint. In such a constellation, the electric energy released in case of a lightning strike is at least partially diverted via the electrically conductive longitudinal reinforcements. This makes it possible to integrate a copper mesh with a reduced material thickness into the skin panel 12 of the shell segment 10 such that weight savings can once again be realized. If sufficient electric insulation exists between two respective metallic longitudinal reinforcements that extend parallel to and at a distance from one another and between the metallic longitudinal reinforcements and the skin panel 12, the two longitudinal reinforcements may represent, e.g., a two-pole bus system for the on-board power supply if the skin panel 12 is realized with a composite fiber plastic material. Any longitudinal reinforcement and/or any circumferential reinforcement basically may serve for accommodating a special system component 30 and/or a certain system medium 32.

FIG. 2 shows a schematic cross section through a fuselage cell or a fuselage section that is realized, among other things, with integrally designed shell segments.

A fuselage cell 50 or a fuselage section 52 is formed, among other things, by the integral shell segment 10 that serves as a top shell, another integrally designed shell segment 54 that serves as bottom shell, a floor framework 56 and two conventional, non-integral shell segments 58, 60 in the form of lateral shells. The coordinate system 16 once again elucidates the position of the components in space. In this case, the design of the shell segment 54 that functions as bottom shell essentially follows the constructive design of the shell segment 10—with skin panel 12 and longitudinal reinforcement 14—that serves as a top shell in this example such that we refer to the corresponding explanations in the description of FIG. 1 in this respect. The joining of the four shell segments 10, 54, 58, 60 respectively takes place in the region of unidentified longitudinal edges of the four shell segments 10, 54, 58, 60 such that four longitudinal seams 62 are created.

The likewise integrally designed floor framework 56 is conventionally joined with the two shell segments 58, 60. The floor framework 56 features longitudinal reinforcements 66, 68 that are realized integrally with a floor surface 64 and in which system components 30, 32 are also accommodated such that the same weight savings and installation simplification measures are achieved as in the case of the integrally designed shell segments 10, 54. Further weight savings are achieved if the system components 30 have such a high mechanical load-bearing capacity that they can—in addition to their primary functions during flying operations and ground operations—also absorb at least part of the loads acting upon the floor framework 56. Consequently, the system components 30 act as at least part of the support structure of the floor framework 56 that can be dimensioned correspondingly weaker in this case.

In the exemplary embodiment illustrated in FIG. 2, the floor framework is also supported on the shell segment 54 by means of two unidentified supports that extend parallel to the z-axis of the coordinate system 16. In a not-shown self-supporting embodiment, the vertical supports could be eliminated if the floor framework 56 has a sufficient mechanical load-bearing capacity.

FIG. 3 shows a simplified basic illustration of a very long shell segment that forms part of the fuselage cell 50 with a plurality of double-functional longitudinal and circumferential reinforcements. The coordinate system 16 illustrates the position of the components in space. The fuselage cell 50 continues on both ends as indicated with continuation dots on both sides.

A shell segment 80 is realized with a skin panel 82 that is provided with a plurality of longitudinal and circumferential reinforcements 84, 86 that, according to the invention, have an integral design. In the exemplary embodiment illustrated in FIG. 3, the longitudinal and circumferential reinforcements 84, 86 also serve—in addition to their primary load-bearing function within the shell element 80 or the primary structure of the fuselage cell 50 assembled thereof—for accommodating and routing one possible system medium 32 in the form of air. Additional pipelines within the reinforcements 84, 86 are not required such that weight savings are also realized in this respect. The longitudinal reinforcements 84 are realized with a tubular hollow profile that has an approximately annular cross-sectional geometry in this case while the circumferential reinforcements 86 that serve as (annular) frames of the primary structure are respectively realized with a channel-like profile, the cross-sectional geometry of which approximately corresponds to that of a rectangular hollow profile.

In addition, the longitudinal and the circumferential reinforcements 84, 86 can absorb at least part of the loads from the primary structure in this case such that the primary structure can be dimensioned correspondingly weaker with respect to the loads occurring during flying operations and another weight reduction is achieved. In addition, the longitudinal and circumferential reinforcements 84, 86 that are designed integrally with the skin panel 82 significantly simplify the installation because it is no longer necessary to install any air ducts for air-conditioning the interior of the fuselage cell 50 into this fuselage cell after the completion of the primary structure. The fitting of the fuselage cell 50 with technical equipment is carried out at the same time as the assembly of the fuselage cell 50 rather than in stages after the completion thereof such that the installation times are significantly reduced.

Any system mediums 32 other than air may also be routed or conveyed by means of the longitudinal and circumferential reinforcements 84, 86 and/or a plurality of different systems components 30 can be incorporated into the fuselage cell 50 by means of the reinforcements 84, 86.

LIST OF REFERENCE SYMBOLS

10. Shell segment
12. Skin panel
14. Longitudinal reinforcement (stringer)
16. Coordinate system
18. Base section
20. Flank (longitudinal reinforcement)
22. Flank (longitudinal reinforcement)
24. Flange (longitudinal reinforcement)
26. Flange (longitudinal reinforcement)
28. Hollow space
30. System component
32. System medium
34. Longitudinal edge (shell segment)
36. Longitudinal edge (shell segment)
50. Fuselage cell
52. Fuselage section
54. Shell segment (bottom shell)
56. Floor framework
58. Shell segment (lateral shell)
60. Shell segment (lateral shell)
62. Longitudinal seam
64. Floor surface
66. Longitudinal reinforcement
68. Longitudinal reinforcement
80. Shell segment
82. Skin panel
84. Longitudinal reinforcement
86. Circumferential reinforcement (frame)

The invention claimed is:

1. A fuselage cell for an aircraft comprising:
a plurality of shells segments and a floor framework,
at least two of the shell segments being provided with a plurality of reinforcements that are realized integrally with a skin panel of the respective shell segment so as to form integral shell segments, the reinforcements being at least one of longitudinal and circumferential,
the floor framework supported on at least one of the integral shell segments, the floor framework comprising a floor surface, at least one longitudinal reinforcement integrally formed with the floor surface so as to provide a hollow space there between, and a conduit configured to receive at least one system component and/or at least one system medium, the conduit disposed in the hollow space formed between the floor surface and the at least one longitudinal reinforcement,
wherein the conduit is a load bearing part of the floor framework of the aircraft.

2. The fuselage cell according to claim 1, wherein at least one of the plurality of reinforcements of at least one shell segment at least sectionally has at least one of an open and a closed cross-sectional geometry.

3. The fuselage cell according to claim 1, wherein at least one longitudinal reinforcement at least sectionally has an Ω-shaped cross-sectional geometry.

4. The fuselage cell according to claim 1, wherein the conduit is integrated into the floor framework.

5. The fuselage cell according to claim 1, wherein the at least one system component comprises at least one of an electrical and optical line for transmitting at least one of energy and information.

6. The fuselage cell according to claim 1, wherein the at least one system component comprises at least one of a hydraulic line, a pneumatic line and an air-conditioning duct.

7. The fuselage cell according to claim 1, wherein the skin panels, as well as the plurality of reinforcements of the shell segments are realized with at least one of a metallic material and a composite fiber plastic material.

8. The fuselage cell according to claim 7, wherein the metallic material comprises a light alloy.

9. The fuselage cell according to claim 8, wherein the light alloy is one of an aluminum alloy and a titanium alloy.

10. The fuselage cell according to claim 7, wherein the composite fiber plastic material comprises a fiber-reinforced thermosetting epoxy resin that is reinforced.

11. The fuselage cell according to claim 10, wherein the reinforcement of the epoxy resin comprises one of carbon fibers and a fiber-reinforced thermoplastic polymer.

* * * * *